United States Patent
Jones et al.

(10) Patent No.: US 9,852,118 B2
(45) Date of Patent: Dec. 26, 2017

(54) DESCRIBING DATA TRANSFORMATIONS USING MARKUP LANGUAGE EXTENSIONS

(71) Applicant: Microsoft Technology Licensing, LLC, Redmond, WA (US)

(72) Inventors: Gareth A. Jones, Issaquah, WA (US); James Lau, Redmond, WA (US); Srivatsa Srinivasan, Redmond, WA (US); Fnu Arun Sudhir, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 444 days.

(21) Appl. No.: 14/278,469

(22) Filed: May 15, 2014

(65) Prior Publication Data

US 2015/0331838 A1 Nov. 19, 2015

(51) Int. Cl.

| *G06F 17/00* | (2006.01) |
|---|---|
| *G06F 17/24* | (2006.01) |
| *G06F 17/30* | (2006.01) |
| *G06F 17/21* | (2006.01) |
| *G06F 17/22* | (2006.01) |

(52) U.S. Cl.
CPC ............ *G06F 17/24* (2013.01); *G06F 17/211* (2013.01); *G06F 17/227* (2013.01); *G06F 17/30893* (2013.01); *G06F 17/30896* (2013.01)

(58) Field of Classification Search
CPC ...... G06F 17/24; G06F 17/211; G06F 17/227; G06F 17/30893; G06F 17/30896
See application file for complete search history.

(56) References Cited

U.S. PATENT DOCUMENTS

| 2003/0237046 | A1* | 12/2003 | Parker | G06F 17/24 |
| | | | | 715/234 |
| 2004/0268231 | A1* | 12/2004 | Tunning | G06F 17/2247 |
| | | | | 715/236 |
| 2008/0139191 | A1* | 6/2008 | Melnyk | G06F 17/30905 |
| | | | | 455/419 |
| 2009/0144158 | A1* | 6/2009 | Matzelle | G06F 17/30899 |
| | | | | 705/14.56 |
| 2013/0100242 | A1 | 4/2013 | Canitz | |
| 2013/0262978 | A1 | 10/2013 | Reshadi et al. | |

OTHER PUBLICATIONS

Chris Bewick, HTML5 Custom Data Attributes (Data-*), May 27, 2010, HTML5 Doctor, pp. 1-5 Retrieved: http://html5doctor.com/html5-custom-data-attributes/.*

Aurelio De Rosa, Managing Custom Data with the HTML5 Dataset API, Jan. 10, 2014, pp. 1-10 Retrieved: https://www.sitepoint.com/managing-custom-data-html5-dataset-api/.*

(Continued)

*Primary Examiner* — Howard Cortes
(74) *Attorney, Agent, or Firm* — Christopher J. Volkmann; Kelly, Holt & Christenson, PLLC

(57) ABSTRACT

Markup language inputs are received for generating a markup language description of an item to be rendered. The markup language inputs include in-line metadata describing a transformation to be performed on a data item before it is rendered. The markup language description, including the in-line metadata describing the transformation, is generated and presented for transformation and rendering.

18 Claims, 11 Drawing Sheets

(56) References Cited

OTHER PUBLICATIONS

JavaScript Kit, Custom Attributes in HTML 5, Published: May 26, 2009, pp. 1-5 Retrieved: http://www.javascriptkit.com/dhtmltutors/customattributes.shtml.*

MSDN, Chapter 7: Manipulating Client—Side HTML, Published: 2011, pp. 1-14 Retrieved: https://msdn.microsoft.com/enus/library/ff921171(d=printer).aspx.*

"<iframe>—Mozilla Developer Network", Published on: Aug. 18, 2013, Available at: https://developer.mozilla.org/en-US/docs/Web/HTML/Element/iframe.

Studholme, Oli, "Extending HTML5—Microdata", Published on: Nov. 23, 2010 Available at: http://html5doctor.com/microdata/.

Lewis, Emily P., "Native Audio with HTML5", Published on : Sep. 26, 2012, Available at: http://msdn.microsoft.com/en-us/hh550090.aspx.

\* cited by examiner

DESCRIBING DATA TRANSFORMATIONS USING MARKUP LANGUAGE EXTENSIONS

BACKGROUND

Computer systems are currently in wide use. Many computer systems use a markup language in order to interpret and present the content on a given page.

A markup language describes the structure of a website (or other content) semantically, and includes cues for its presentation. One example of a markup language is hypertext markup language (HTML), and variants thereof. HTML is written using markup language elements. Each element normally includes an opening tag and a closing tag, although some elements use a single, unpaired tag. A web browser reads the markup language documents and composes them into audible or visible pages. A markup language often allows an author to embed objects or documents into the structure of a page.

In some scenarios, an author may generate a markup language description of content (e.g., a page) that embeds a document or object. The author may wish the document or object to be transformed in some way, prior to having it rendered. In some cases, the author may be sending the content to a receiving party. The content may include data to be presented, that is in a format not normally understood by the receiving party, if the receiving party is performing conventional markup language processing. In such a case, while many markup language variations have a rich set of capabilities for presenting a wide set of data, they do not have a built in transformation specification mechanism in order to specify a transformation that is to be performed on an item of content, prior to rendering it.

An example may be helpful. Assume that a piece of client software is communicating with a content management server. Assume further that the client software wishes to create a new piece of content, using a markup description language. If the client has a document in a word processing format that it would like presented as a static image within the rendered content, there is no standard mechanism within markup languages to communicate this.

In order to overcome this difficulty, the client may perform the transformation before using the markup language to communicate the content. However, this requires the client to have the ability to convert from one format to another, and this may not be the case. For instance, the client device may be constrained in terms of its computational and memory resources. Similarly, it may be that the client device has relatively little network bandwidth and the transformation may transform the document into a larger amount of data that needs to be transmitted (e.g., transforming a word processing document into an image can greatly expand the amount of information corresponding to the document). In such cases, it may be less desirable for the client device to perform the transformation and then transmit the transformed version of the document.

The discussion above is merely provided for general background information and is not intended to be used as an aid in determining the scope of the claimed subject matter.

SUMMARY

Markup language inputs are received for generating a markup language description of an item to be rendered. The markup language inputs include in-line metadata describing a transformation to be performed on a data item before it is rendered. The markup language description, including the in-line metadata describing the transformation, is generated and presented for transformation and rendering.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed in the background portion, markup languages do not include a standard mechanism for communicating a transformation that is to be performed on a piece of content, prior to rendering it. Some possible options for addressing this include performing the transformation before communicating the content to the rendering system, as also discussed in the background.

Another option includes overloading a standard markup language attribute. However, this would be done in contradiction to the markup language specification, and would also assume that the receiving party would not only attempt to process the non-standard usage, but would understand what it meant. Also, if the overloaded attribute was normally used to specify a fallback image to be rendered, in case the transformation failed, then there would be no way to specify a fallback image.

Yet another option would be to generate a separate document that includes metadata describing the transformation to be performed on the markup language content. This separate document could be sent along with the markup language document and could include metadata to indicate to the receiving and rendering system where to insert, in the markup language document, the result of the transformation. This, however, is relatively clumsy to create and transfer. It also means that a new document is to be created, in an entirely new content format. It would also likely mean that the rendering system would need manual correlation of the two documents.

Figure 1:
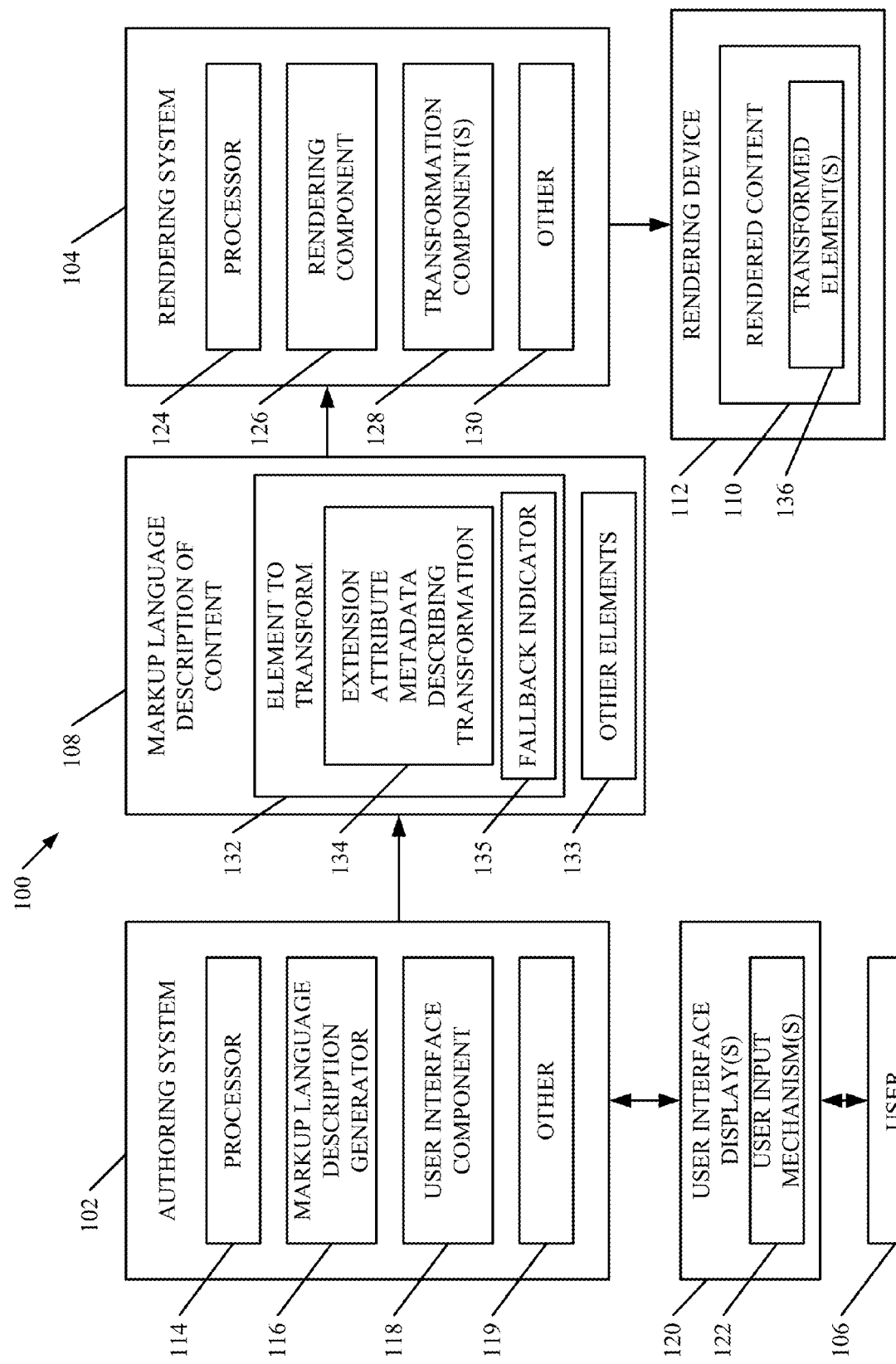
FIG. 1 shows one embodiment of a markup language authoring architecture.

FIG. 1 is a block diagram of one example of a markup language authoring architecture 100. Architecture 100 is shown with an authoring system 102 and a rendering system 104. In the embodiment illustrated, authoring system 102 is used by user 106 to author a markup language description of content 108 and transfer it to rendering system 104. Rendering system 104 renders the markup language description of the content 108, as rendered content 110, on a rendering device 112. In one embodiment, authoring system 102 and rendering system 104 can be on separate devices. In another embodiment, they are two systems on the same device. However, the present discussion will proceed with respect to authoring system 102 being on one device and rendering system 104 being on a separate device, although this is an example only.

Authoring system 102 illustratively includes processor 114, markup language description generator 116, user interface component 118, and it can include other items as well. User interface component 118, either under the direction of markup language description generator 116 or another component, generates user interface displays 120 with user input mechanisms 122, for interaction by user 106. User 106 illustratively interacts with user input mechanisms 122 in order to control and manipulate authoring system 102. In one specific embodiment, user 106 provides the inputs to control markup language description generator 116 in order to generate the markup language description of content 108.

As user 106 is authoring the markup language description of content 108, user 106 can provide inputs that define elements 132-133 in the description of content 108. The elements can include, among other things, extension attributes and fallback indicators 135. The extension attributes identify transformations that are to be performed (if any) on the corresponding element 132, and fallback indictor 135 identifies an image that is to be rendered if that transformation should fail. While only two elements 132 and 133 are shown in the markup language description of content 108, it will be appreciated that a larger number of elements can be provided in description 108 as well. Two are shown for the sake of example only.

Rendering system 104 illustratively includes processor 124, rendering component 126, transformation components 128, and it can include other items 130 as well. Rendering component 126 receives the markup language description of content 108 and parses it for rendering on rendering device 112. In doing so, it identifies elements 132 within the description of content 108, that need to be transformed, prior to rendering. It then identifies extension attribute metadata 134 that describes the transformation to be provided. It provides this metadata to transformation component 128, which performs a transformation on the element 132 so that, when it is rendered by rendering component 126 as rendered content 110, the transformed element 136 is rendered in the transformed format described by metadata 134.

Figure 2:
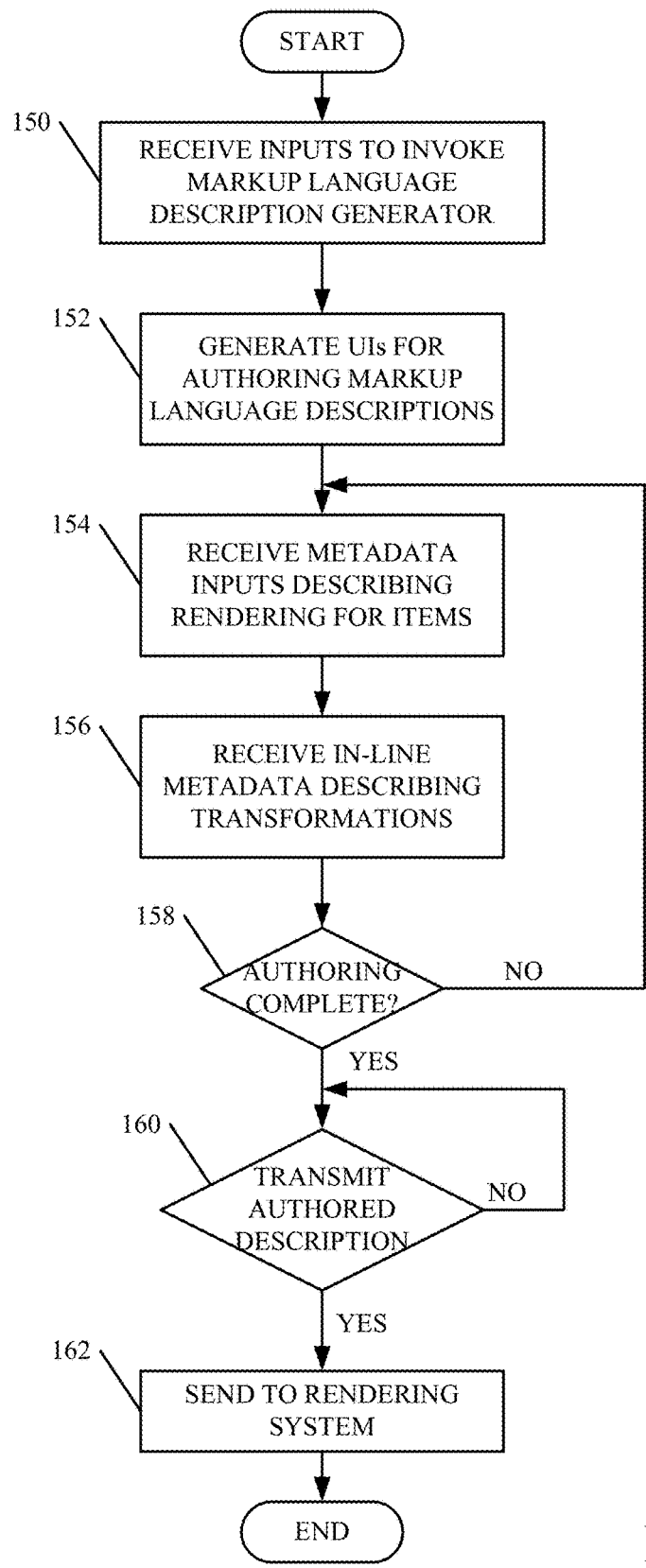
FIG. 2 is a flow diagram illustrating one embodiment of the operation of the architecture shown in FIG. 1.

FIG. 2 is a flow diagram illustrating one embodiment of the operation of authoring system 102 in authoring the markup language description of content 108 based on inputs from user 106. In one embodiment, user 106 first provides inputs to invoke usage of markup language description generator 116. This is indicated by block 150 in FIG. 2. By way of example, user 106 may log into authoring system 102 using authentication information or provide other inputs invoking markup language description generator 116.

Generator 116 then uses user interface component 118 to generate user interfaces (such as user interface displays 120) for receiving markup language description inputs from user 106. Generating the user interfaces is indicated by block 152 in FIG. 2.

Markup language description generator 116 then receives metadata inputs describing how items in the content are to be rendered, using the markup language. This is indicated by block 154. For instance, this can include various opening and closing tags, attribute information, or a wide variety of other markup information describing how the content is to be rendered.

Markup language description generator 116 also receives in-line metadata describing any transformations that are to be performed on any items within the content to be rendered. This is indicated by block 156.

Generator 116 continues to generate the UI displays 120 and receive user inputs until authoring is complete. This is indicated by block 158 in FIG. 2.

At some point, user 106 will wish to transmit the authored description of content 108 to the rendering system 104. This is indicated by block 160. At that point, authoring system 102 transmits the markup language description of content 108 to rendering system 104. This is indicated by block 162.

Figure 3:
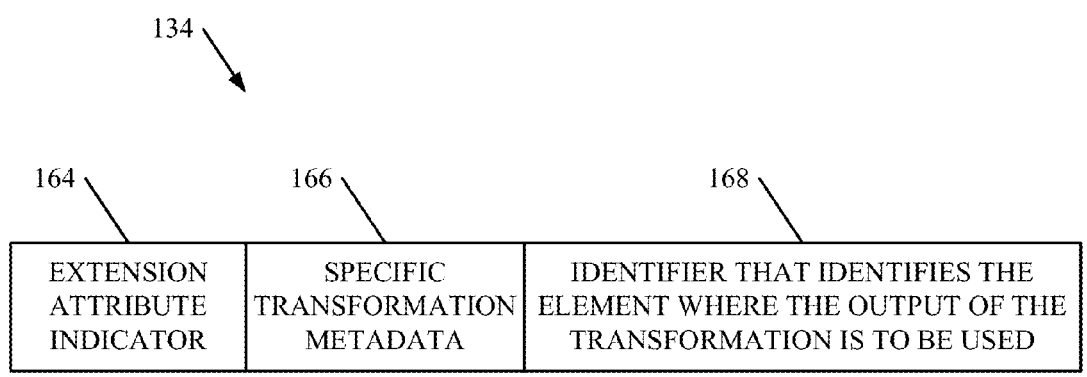
FIG. 3 is a block diagram illustrating one embodiment of a markup language description of content that is to be transformed.

FIG. 3 shows a block diagram of one embodiment of attribute metadata 134 expressed as a markup language pattern that identifies transformations to be performed on content. In the embodiment shown in FIG. 3, the markup language description will include an extension attribute indicator 164, a set of specific transformation metadata 166 and an identifier 168 that identifies the element where the output of the transformation is to be used. A number of specific examples of the metadata pattern 134 are described below.

Figure 4:
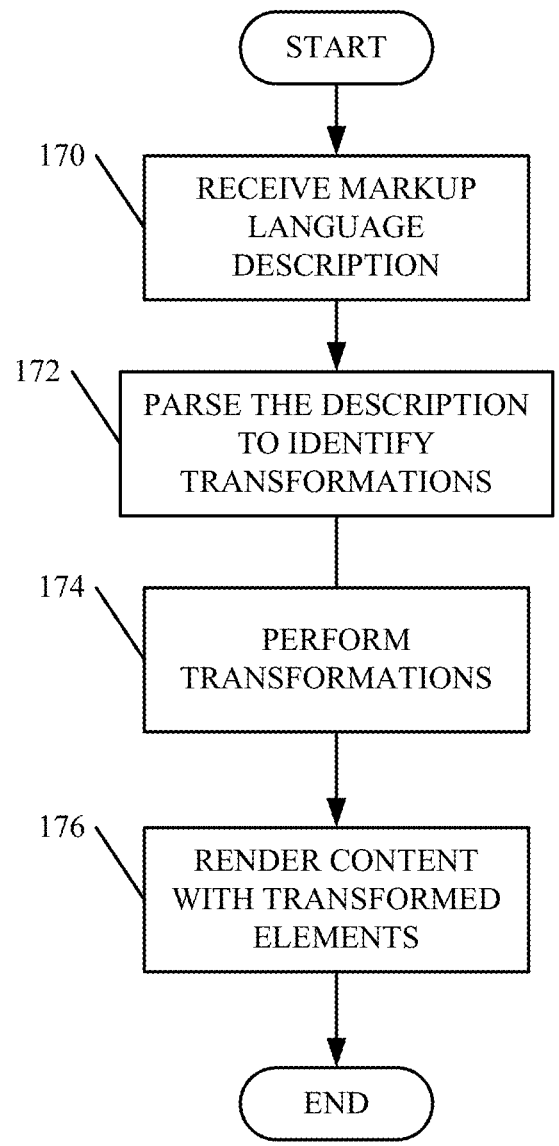
FIG. 4 is a flow diagram illustrating one embodiment of the operation of a rendering system that renders the markup language content.

Once the markup language description of content 108 is received by rendering system 104, rendering system 104 renders it as rendered content 110 on rendering device 112. FIG. 4 is a flow diagram illustrating one embodiment of the operation of rendering system 104 in more detail. Rendering system 104 first receives the markup language description of content 108. This is indicated by block 170 in FIG. 4. Rendering component 126 illustratively parses the description 108 to identify any elements of the content that are to be transformed. This is indicated by block 172 in FIG. 4. For instance, rendering component 126 can parse description 108 to identify elements, such as element 132, that has an extension attribute with metadata that describes a transformation that is to be performed on that element, before it is rendered. When these items are located, transformation component 128 performs the described transformation on that element of the content. Performing the transformation is indicated by block 174. The markup language description 108 can then be rendered as rendered content 110, with the element 134 transformed and rendered in the transformed format as transformed element 136. Rendering the content with the transformed elements is indicated by block 176 in FIG. 4.

Table 1 shows one example implementation that uses the metadata pattern 134 to describe how to render an image of an embedded HTML 5 page within another HTML 5 page.

TABLE 1

```
<html>
<head />
<body>
...
<img data-render-src='http://www.microsoft.com'
data-format-src='image/jpeg'
src='http://www.mysite.com/renderFailed.jpg' width='400'
height='600' />
...
</body>
</html>
```

Table 1 specifically shows only a portion of a broader HTML 5 document. In the embodiment shown in Table 1, the metadata pattern 134 is expressed as two custom attributes "data-render-src" and "data-format-src". These attributes express a specific implementation of the following pattern:

data-<control_term>-<target_attribute> where "data-" is a literal representing an attribute complying with the HTML 5 standard extensibility mechanism;

"<control_term>" is a token representing the specific transformation metadata being provided; and "<target_attribute>" is a token representing the attribute on the same element whose value to modify using the transformation metadata.

Therefore "data-render-src" instructs the rendering system to replace the content of the "src" attribute with a rendering of its value (e.g., with a snapshot of the identified webpage) as a standard image type, if successful. The "data-format-src" portion instructs the rendering system to use a specific image format as the output of rendering for the "src" property.

Table 2 shows another example of the metadata pattern that is used to describe how to render a spreadsheet as a table element within an HTML 5 page.

TABLE 2

```
<html>
<head />
<body>
...
<table data-render-content='http://www.mysite.com/files/spreadsheet.xlsx'
data-select-content='sheet2' width='600' height='400' />
...
</body>
</html>
```

In the example shown in Table 2, the metadata pattern is specifically expressed as two custom attributes, "data-render-content" and "data-select-content". These attributes are a specific expression of the following pattern:

data-<control_term>-content where "data-" is a literal representing an attribute complying with the standard extensibility mechanism in HTML 5;

"<control_term>" is a token representing the specific transformation metadata being provided; and "-content" is a literal instructing the rendering system to replace the entire content of the element with the output of the transformation.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
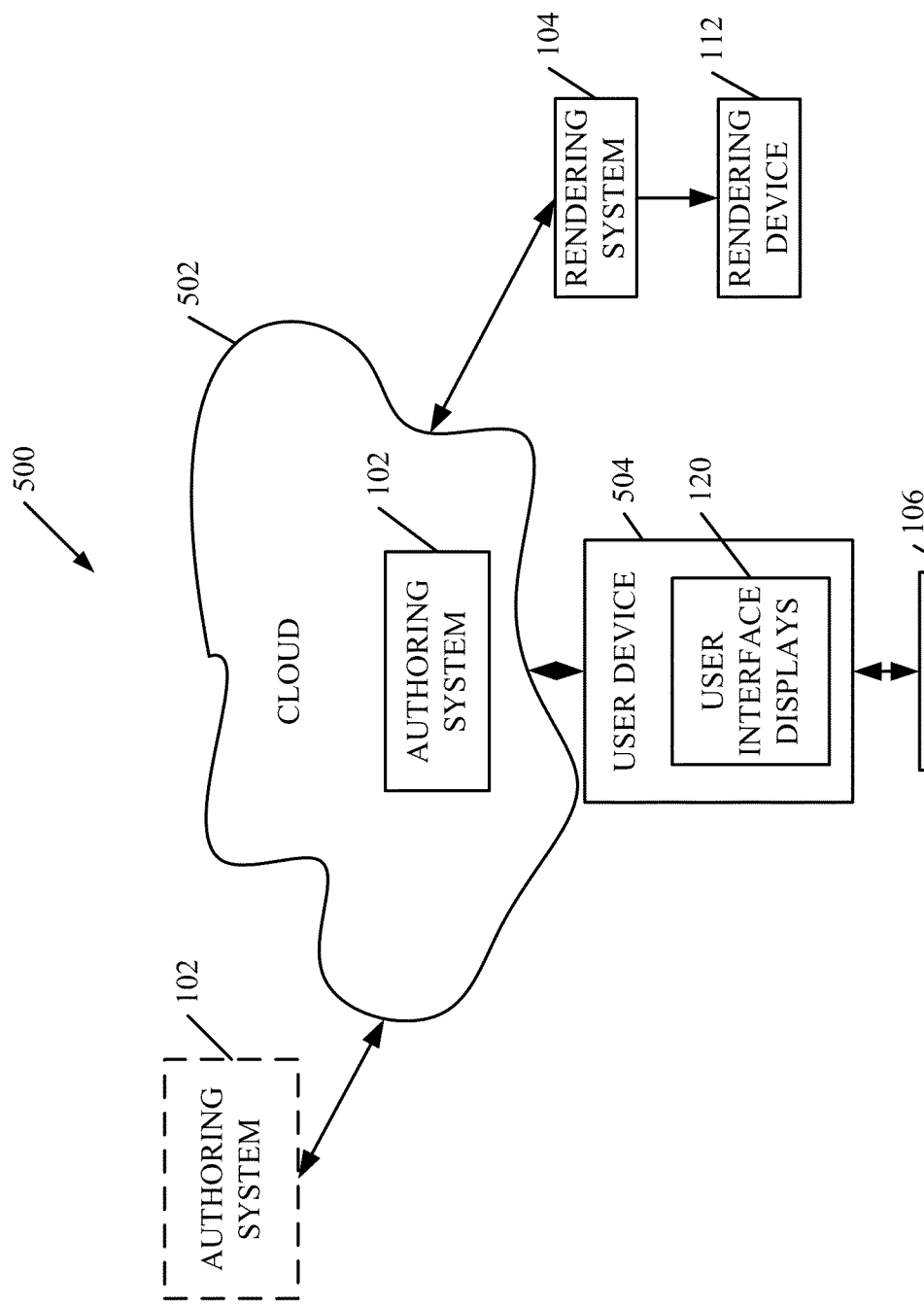
FIG. 5 is a block diagram showing the architecture of FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that authoring system 102 can be located in cloud 502 (which can be public, private, or a combination where portions are public while others are private). Therefore, user 106 uses a user device 504 to access those systems through cloud 502.

FIG. 5 also depicts another embodiment of a cloud architecture. FIG. 4 shows that it is also contemplated that some elements of architecture 100 can be disposed in cloud 502 while others are not. By way of example, authoring system 102 can be outside of cloud 502. Regardless of where it is located, it can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
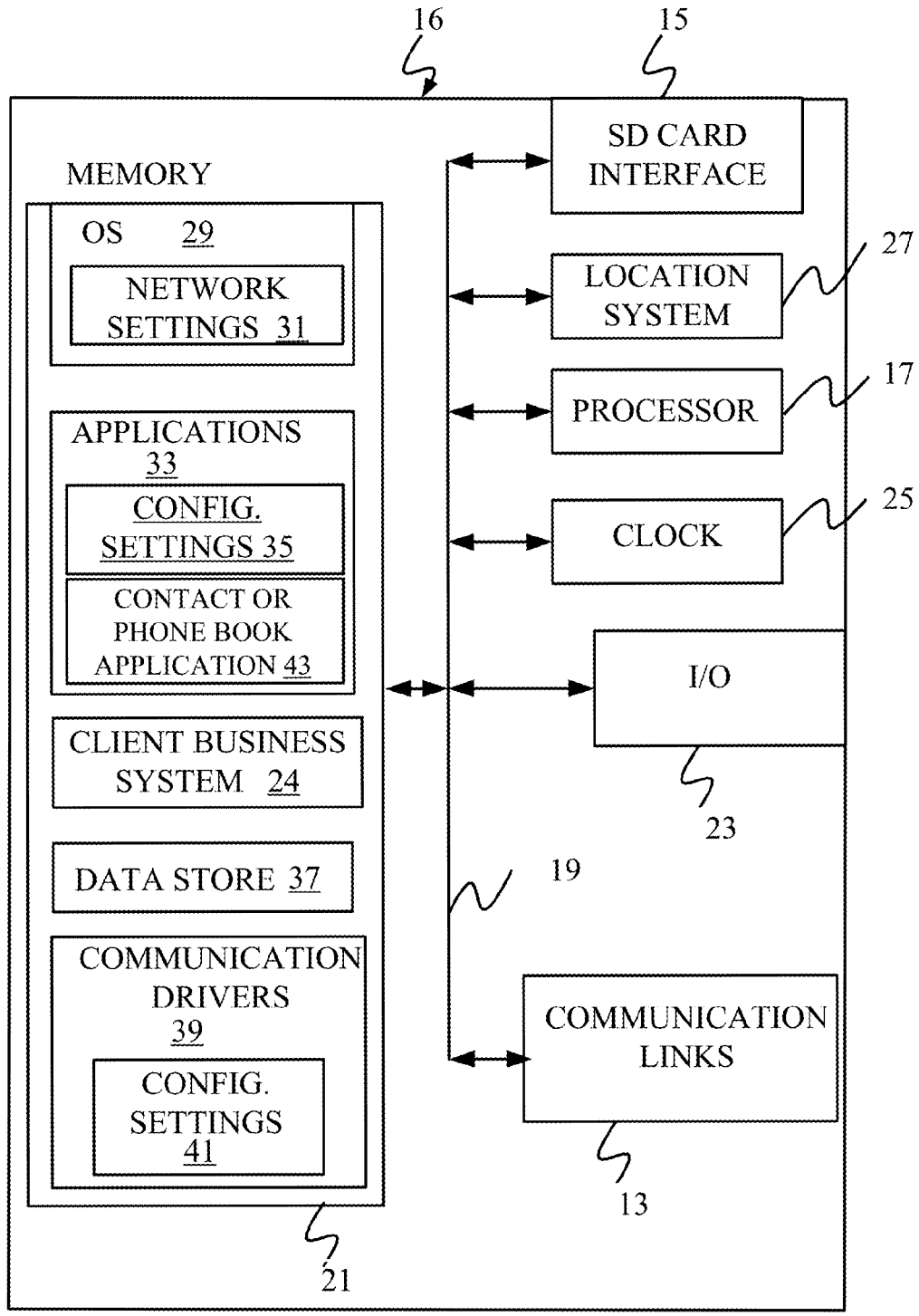
FIGS. 6-10 show various embodiments of mobile devices that can be used in the architecture of FIG. 1.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 114 or 124 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
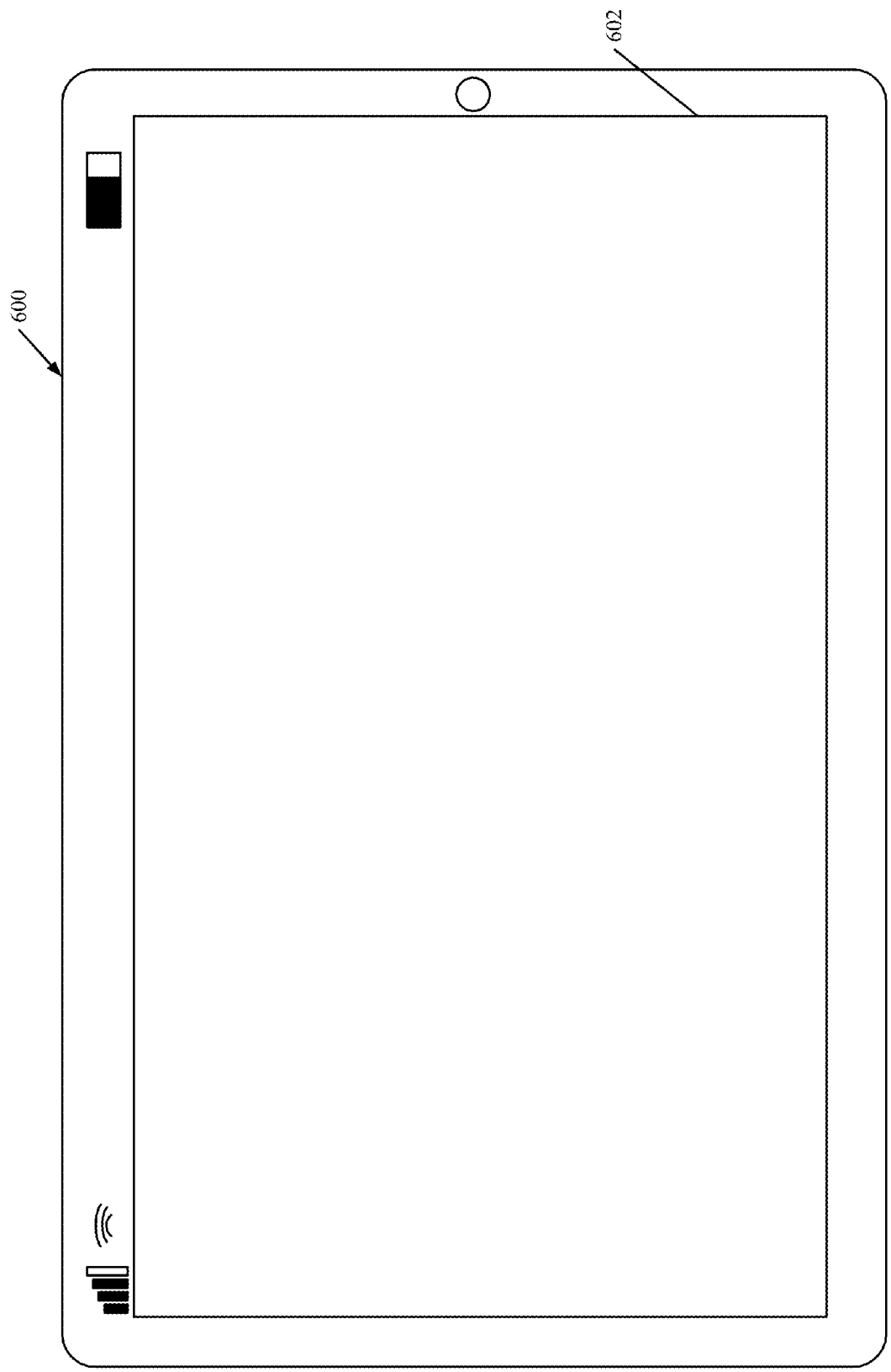

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
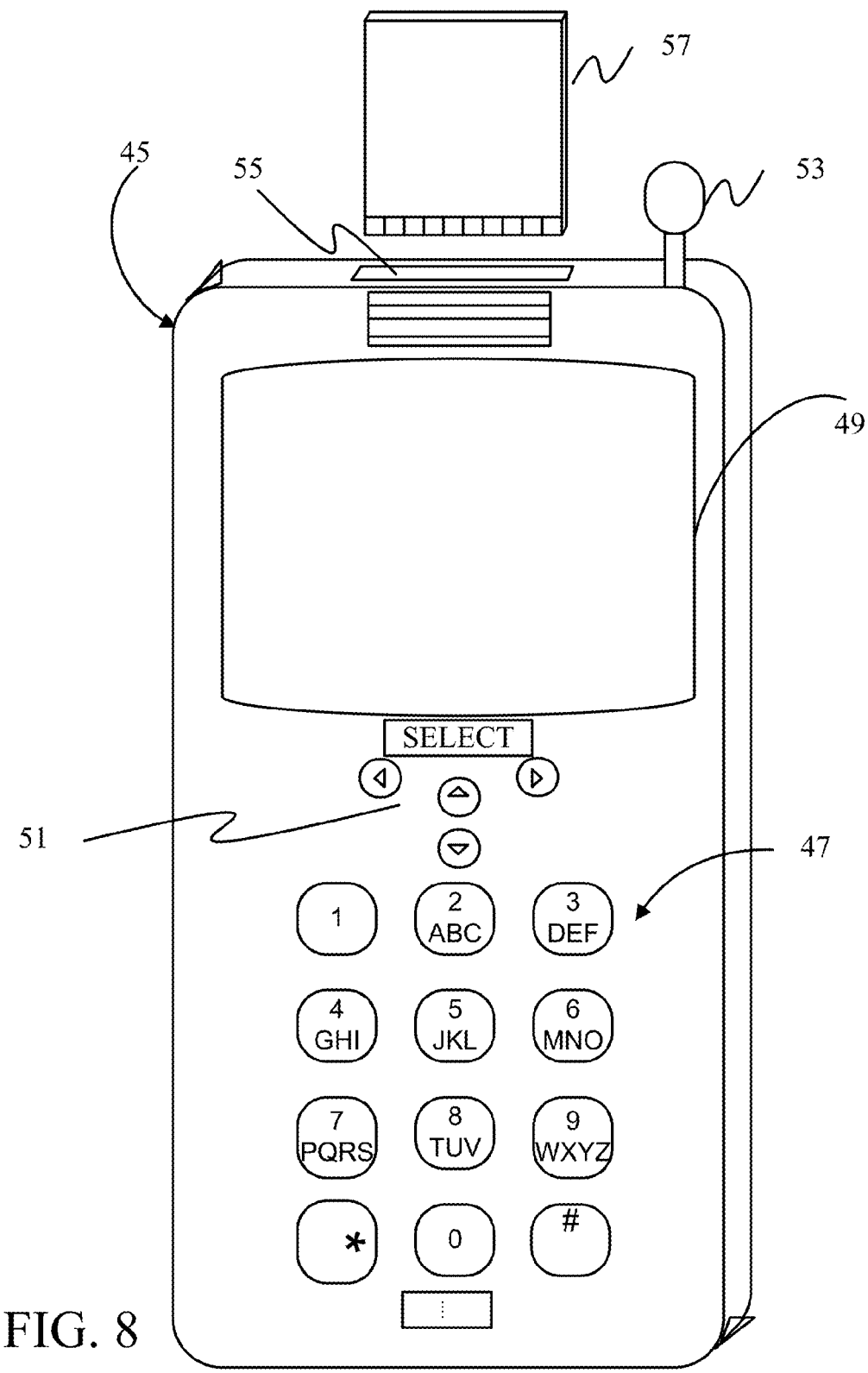
Figure 9:
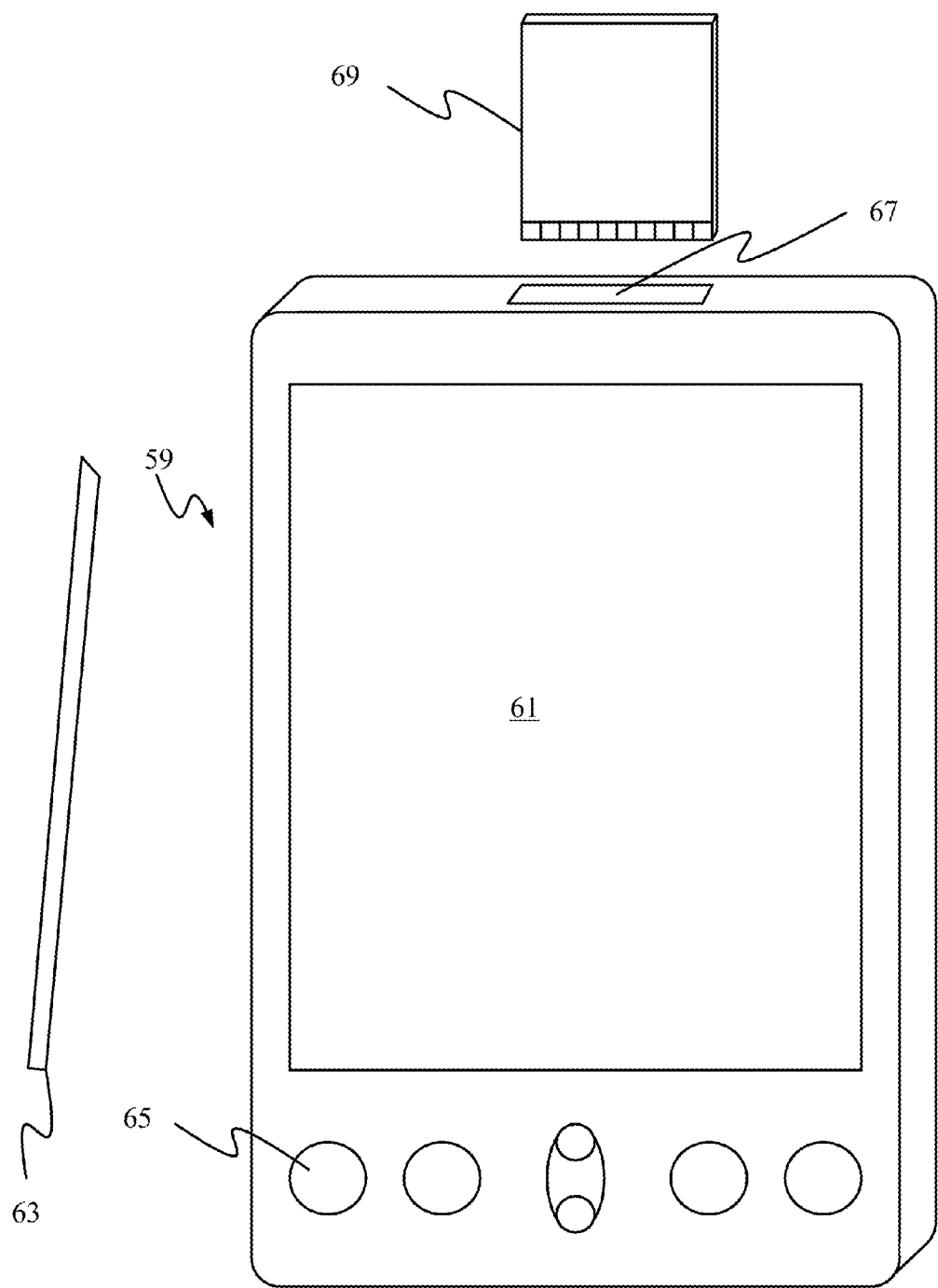

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
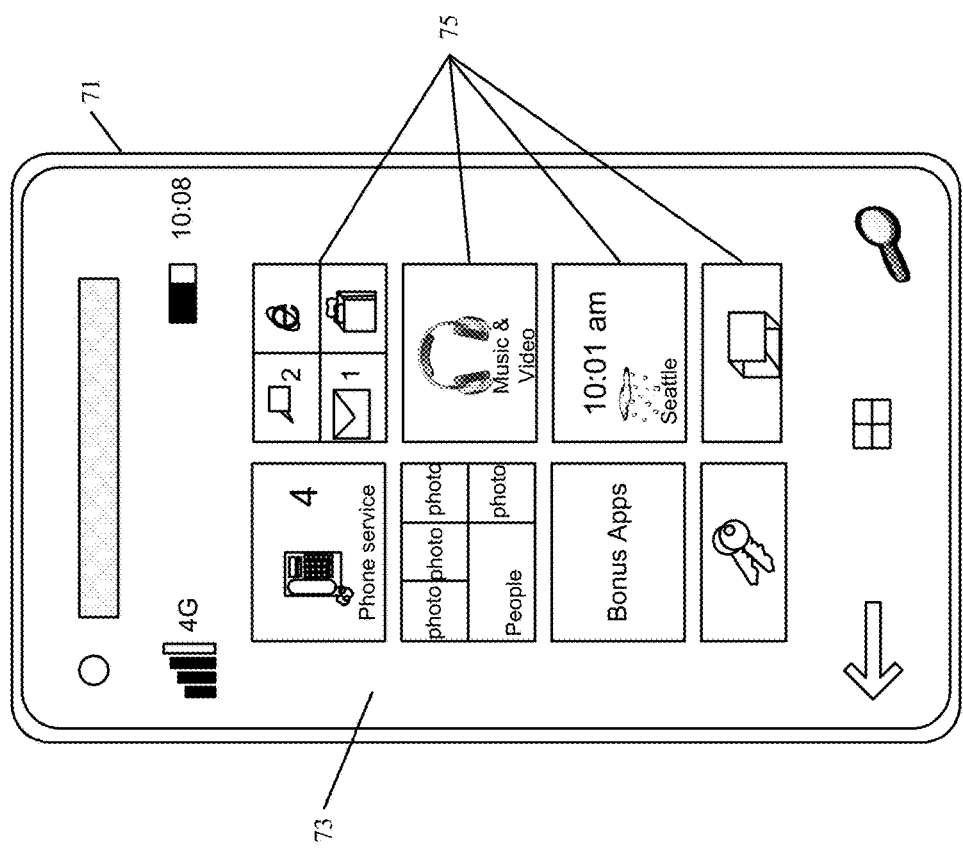

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
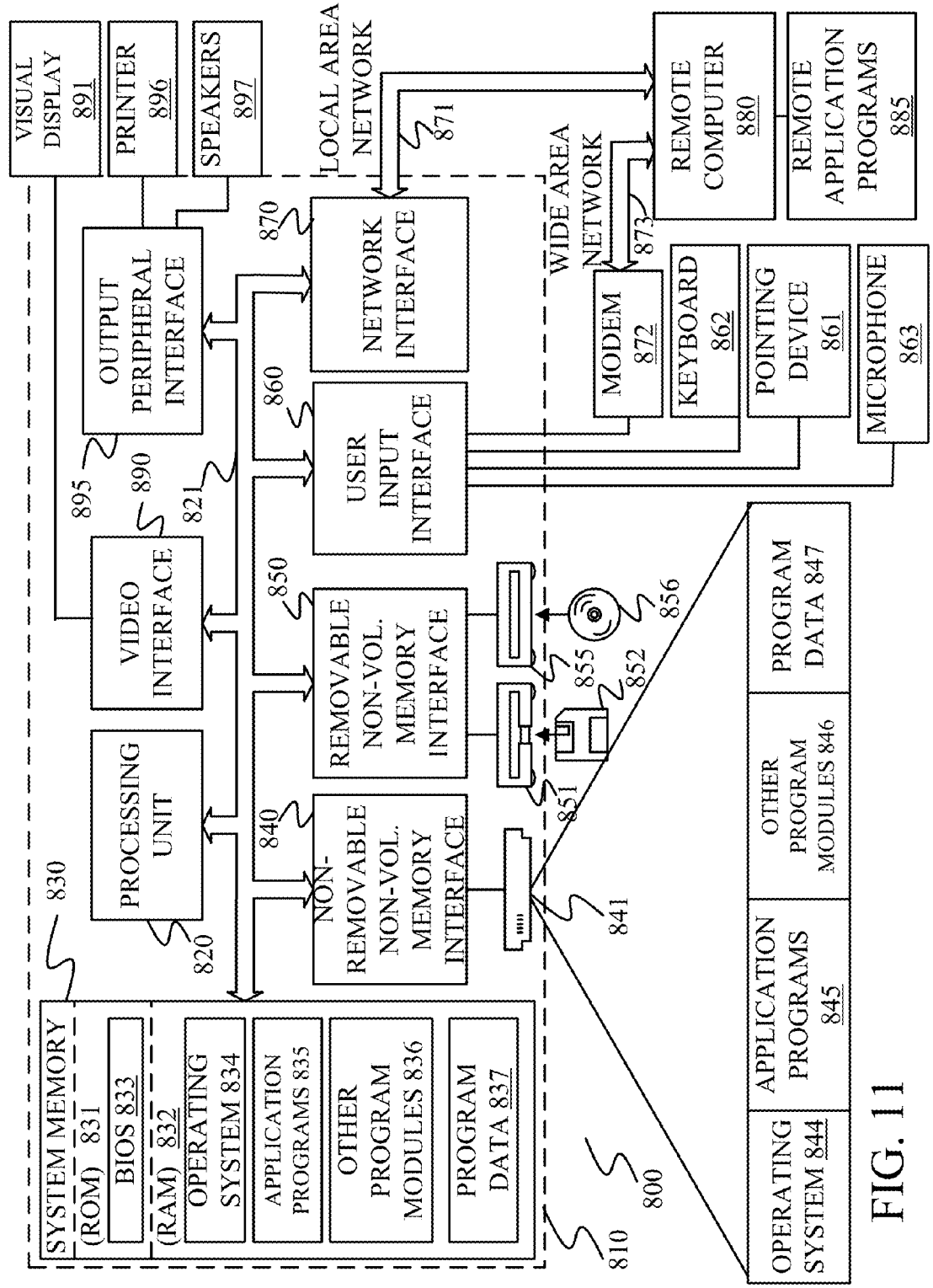
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 114 or 124), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving a markup language authoring input;
   identifying content based on the markup language authoring input;
   receiving a transformation input indicative of a transformation to be performed on a portion of the content prior to rendering the portion of content;
   generating a markup language description of the content based on the markup language authoring input and the transformation metadata input, wherein the markup language description is generated with extension attribute metadata that is separate from, and in line with, markup language rendering information,
      the markup language rendering information describing the content to be rendered by a rendering system, and
      the extension attribute metadata comprising
         an extension attribute indicator,
         a transformation identifier that includes markup language transformation metadata describing the transformation to be performed by the rendering system on the content prior to the rendering system rendering the portion of content, and
         an element identifier that identifies an element in the markup language description that is to hold an output of the transformation; and
      providing the generated markup language description to the rendering system to render the content.

2. The computer-implemented method of claim 1 wherein the transformation to be performed on the portion of content comprises:
   changing a format of the portion of content.

3. The computer-implemented method of claim 2 wherein the markup language description comprises a fallback indicator that indicates content to be rendered if the transformation fails.

4. The computer-implemented method of claim 1 and further comprising:
   rendering the markup language description.

5. The computer-implemented method of claim 4 wherein rendering comprises:
   parsing the markup language description to identify the extension attribute metadata that identifies the transformation.

6. The computer-implemented method of claim 5 wherein rendering Comprises:
   transforming an element of the content based on the markup language transformation metadata in the identified extension attribute metadata.

7. The computer-implemented method of claim 6 wherein rendering comprises:
   rendering the content, using the markup language description, and rendering the transformed element as part of the rendered content.

8. A computer-implemented method comprising:
   receiving an authoring input;
   identifying content based on the markup language authoring input;
   receiving a transformation input indicative of a transformation to be performed on a portion of the content prior to rendering the portion of content;
   generating a markup language description based on the authoring input and the transformation input, the markup language description describing the content;
   prior to rendering the content,
      parsing the markup language description to identify an extension attribute that specifies the transformation to be performed on an element in the content, the transformation comprising a change to a format of the content, wherein parsing comprises identifying a metadata pattern in the markup language description that specifies, as part of the extension attribute, the element in the markup language description that is to hold the transformed element, when the content is rendered; and
      transforming the element in the markup language description using the transformation
   rendering the content, using the markup language description, with the transformed element as part of the rendered content.

9. The computer-implemented method of claim 8 wherein receiving an authoring input comprises:
   receiving a markup language authoring input authoring a markup language description of content; and
   receiving a markup language transformation metadata input describing the transformation to be performed on a portion of the content prior to rendering the portion of content.

10. The computer-implemented method of claim 8, wherein the extension attribute metadata is generated according to a pattern that includes the extension attribute indicator as an extension attribute literal, the a transformation identifier identifying the transformation to be performed, and the element identifier that identifies an element in the description that is to hold an output of the transformation.

11. The computer-implemented method of claim 8, wherein the markup language description comprises a fallback indicator that indicates content to be rendered if the transformation fails.

12. A computing system comprising:
   at least one processor; and
   memory storing instructions executable by the at least one processor, wherein the instructions, when executed, configure the computing system to:
   receive a markup language authoring input;
   identify content based on the markup language authoring input;
   receive a transformation input indicative of a transformation to be performed on a portion of the content prior to rendering the portion of content, wherein the transformation comprises a change to a format of the portion of the content;
   generate a markup language description of the content based on the markup language authoring input and the transformation input, wherein the markup language description is generated with extension attribute metadata that is separate from, and in line with, markup language rendering information, the markup language rendering information describing the content to be rendered by a rendering system; and
   the extension attribute metadata comprising:
      an extension attribute indicator,
      a transformation identifier that includes markup language transformation metadata describing the transformation to be performed by the rendering system on the portion of the content prior to the rendering system rendering the portion of content; and
      an element identifier that identifies an element in the markup language description that is to hold an output of the transformation; and
   provide the generated markup language description to the rendering system to render the content.

13. The computing system of claim 12 wherein the markup language description comprises a fallback indicator that indicates content to be rendered if the transformation fails.

14. The computing system of claim 13 wherein the extension attribute metadata is generated according to a pattern that includes the extension attribute indicator as an extension attribute literal, the transformation identifier identifying the transformation to be performed, and the element identifier that identifies an element in the description that is to hold an output of the transformation.

15. The computing system of claim 14 wherein the instructions, when executed, configure the computing system to:
   render the markup language description.

16. The computing system of claim 15 wherein the instructions, when executed, configure the computing system to:
   parse the markup language description to identify the extension attribute metadata that identifies the transformation.

17. The computing system of claim 16 wherein the instructions, when executed, configure the computing system to:
   transform an element of the content based cm the markup language transformation metadata in the identified extension attribute metadata.

18. The computing system of claim 17 wherein the instructions, when executed, configure the computing system to:
   render the content, using the markup language description, and render the transformed element as part of the rendered content.

* * * * *